United States Patent Office 2,952,112
Patented Sept. 13, 1960

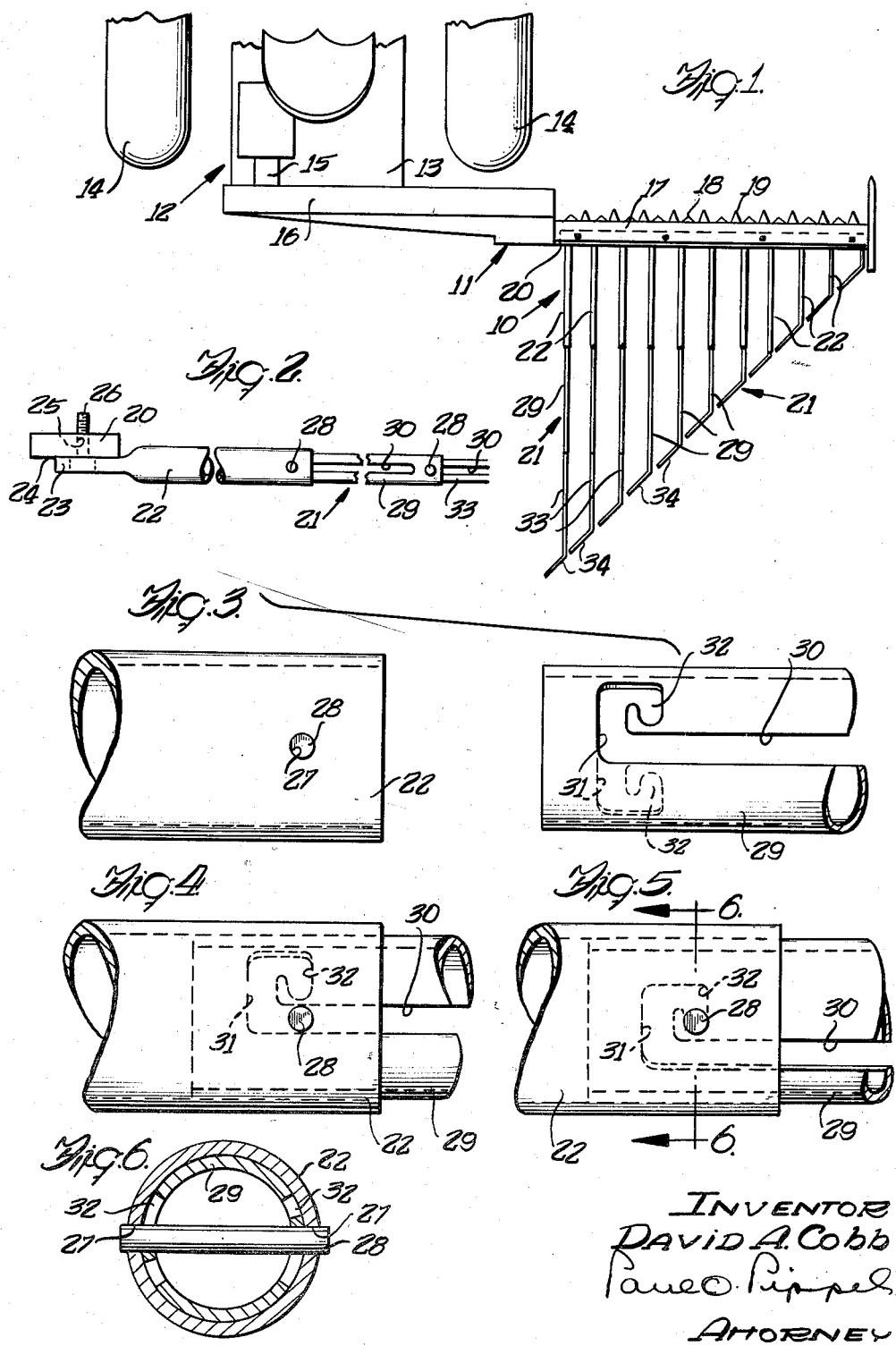

2,952,112

WINDROWING ARRANGEMENT FOR MOWERS

David A. Cobb, Park Forest, Ill., assignor to International Harvester Company, Chicago, Ill., a corporation of New Jersey Filed Oct. 20, 1958, Ser. No. 768,447

1 Claim. (Cl. 56—192)

This invention relates to a windrowing attachment. More specifically the invention relates to a quickly detachable windrowing attachment for sickle bar tractor mowers.

It is a prime object of this invention to provide an improved and simplified windrowing attachment readily attachable and detachable from the sickle bar of a tractor mower.

A still further and more specific object is the provision of an improved windrowing attachment for tractor mowers, said attachment having telescoping slats which are readily collapsible to place the attachment in a transport position.

Another object is to provide a windrowing attachment having a plurality of tubular slat sections which are quickly collapsible when desired to move the attachment to a transport position with the sickle bar of a tractor mower.

A still further object is to provide an improved windrow attachment having a plurality of collapsible tubular slats and including a novel arrangement for maintaining the slats in an extended operating position.

These and other objects will become more readily apparent from a reading of the specification when examined in connection with the accompanying sheet of drawing.

In the drawing:

Figure 1 is a plan view showing a portion of a tractor having a sickle bar type mower connected thereto with a windrowing attachment connected to the sickle bar and being positioned in an operating position;

Figure 2 is an enlarged side elevational view showing a slat portion of an improved windrowing attachment with certain portions broken away;

Figure 3 is an enlarged exploded view showing the connecting ends of a pair of tubular slat sections normally secured together in telescoping arrangement;

Figure 4 is an enlarged side elevational view showing the connecting ends of a pair of telescoping tubular slat members in a position just prior to locking said elements in an extended position;

Figure 5 is an enlarged side elevational view showing the interconnection of a pair of telescoping tubular members wherein the said members are locked in an extended position; and Figure 6 is a cross sectional view taken along the line 6—6 of Figure 5.

Referring to the drawing, a windrowing attachment is generally designated by the reference character 10. As shown in Figure 1, the windrowing attachment 10 is connected to a tractor mounted mower 11 in turn connected to a tractor 12. The tractor 12 is provided with a body 13 supported on ground wheels 14. A conventional power take-off unit 15 supports a swingable support 16 to which a mower or sickle bar 17 is connected. The type of tractor mower shown may be conventional, the sickle bar 17 including reciprocating cutters 18 movable between stationary fingers 19. Normally the power take-off 15 operates to reciprocate the cutters 18 during the operating position of the mower bar 17. During a non-operating position, the mower bar 17 may be usually hinged relative to the swingable support 16 to a non-operating substantially vertical position. This arrangement is conventional and has not been shown in detail.

Windrowing attachments which are attachable to the mower bar of a tractor mounted mower are conventional in the art. The windrowing attachments generally comprise a plurality of transversely spaced slats which extend in a direction rearwardly with respect to the mower bar. The slats are usually of shorter length at the outermost end of the mower bar but progressively increase in length, the longest slat being the one most inwardly disposed with respect to the outer end of the mower bar. The slats also at their ends usually include short tines or teeth and as the vegetation is cut by the mower bar, the windrowing slats are effective to neatly place the cut vegetation into windrows. When the mower bar is moved to a substantially vertical transport position, the length of the slats becomes a problem. Since the slats of a conventional windrower are quite long, they become unwieldy when the mower is placed in a transport position and in many instances interfere with the proper operation of the tractor by the operator. It is obvious that because of their length the slats will bend and whip back and fourth during the transport position thus creating undesirable hazards.

Referring now particularly to Figure 1, it can be seen that the windrow attachment 10 overcomes the aforementioned problem in that the slats of the attachment 10 are collapsible. The windrowing slats are generally designated at 21 and each slat includes a first tube 22 having a flattened portion 23 which is securely welded to a support bar 20 normally coextensive with the mower bar 17. The weld is designated at 24 in Figure 2.

The support 20 is provided with a plurality of laterally spaced openings 25 and suitable securing means in the form of bolts 26 connect the support 20 to the mower bar 17. The tubes 22 are provided at their free ends with pairs of transversely aligned openings 27 in which pins 28 are suitably secured. As best shown in Figure 2, a second tube 29 is telescopingly positioned within each tube 22. The second tubes 29 also each include a pair of transversely aligned slots 30 which at one end, as best shown in Figures 3 through 5, are in communication with laterally extending slots 31 disposed on opposite sides of the tubes 29. Each of the laterally extending slots 31 is also in communication with a reversely bent or hook type slot 32 disposed on opposite sides of each tube 29 as best shown in Figure 3.

Referring now again to Figure 1, it is apparent that the short slats 21 at the outermost end of the mower bar are not of the telescoping type and thus may be of single tube construction. Counting inwardly toward the tractor the next four slats 21 are telescopingly tubular and include the tubular members 22 and 29. The next three slats 21 include in each case a third tubular member designated at 33. All of the slats 21 include at their ends the tines or raking fingers 34. As shown in Figure 2, one end of the tube 29 is provided with a pin 28 which in turn limits the extension of the third tube 33. The tube 33 also includes transversely aligned elongated slots 30 and it is to be understood that the tubes 33 also include the slots 31 and hooked slots 32 so that the tubes 33 may be placed in a locked position in the same manner as the tubes 29, one of which is shown in the locked position in Figure 5.

In Figure 1 the windrow attachment 10 is shown in the operating position wherein each of the telescoping type slats 21 are fully extended. As above pointed out, four of the slats 21 are non-telescoping, another four of the slats 21 have one tube 29 telescoping into a stationary tube 22 and the remaining three slats 21 include three tubular sections 22, 29 and 33 which are positioned in relative telescoping relation. In the transport position the tubes 33 are merely telescoped into the tubes 29 and the tubes 29 in turn are telescopingly moved into the tubes 23 whereupon the telescoping slats 21 are shortened to substantially the same length as the non-telescoping slats 21. The tubes 29 of the slats 21 having only the two tubular sections, are collapsed into the tubes 23 and thus it is apparent that in this collapsed position the slats 21 are of the desired length suitable for transporting. When the mower is again placed into an operative position, it is a simple matter to pull all of the tubes into the extended position and as shown in Figures 3, 4 and 5, these tubes may be securely locked in the extended position. Locking action takes place by simply turning the tubes 29 and 33 so that the pins 28 ride into the slots 31 and become seated in the hooked slots 32 whereupon the tubes are securely locked in an extended position.

Thus it is apparent that the windrowing attachment may be quickly attached to the mower bar of a tractor mower. Furthermore, the slats 21 may be quickly locked in an extended position and may be quickly collapsed when it is desired to place the attachment into transport position. Thus the objects of the invention have been fully achieved and it must be understood that changes and modifications may be made without departing from the spirit of the invention as disclosed or the scope of the appended claim.

What is claimed is:

For a mower having a laterally extending sickle bar; a windrow attachment comprising a supporting bar adapted to be attached to said sickle bar to extend laterally therewith, a plurality of laterally spaced substantially parallel windrowing slats connected to said supporting bar, at least one of said slats comprising a first tube connected at one end to said supporting bar and extending laterally with respect thereto, a second tube telescopingly connected to said first tube, said second tube including at one end a windrowing finger, said second tube being disposed within and being telescopingly movable with respect to said first tube from an extended working to a retracted transport position, means locking said second tube in the extended working position including a locking pin extending through an end portion of said first tube, said second tube having an elongated longitudinal slot and a laterally extending slot connecting with said longitudinal slot, said second tube also including a reversely bent slot connecting with said laterally extending slot to provide a hook portion on said second tube, said hook portion in one position being engaged by said pin to lock said tubes with respect to telescoping movement in the extended position, said second tube being rotatable whereby said pin engages said elongated slot and said second tube may be moved to a collapsed transport position.

References Cited in the file of this patent
UNITED STATES PATENTS

| | | |
|---|---|---|
| 279,267 | Nock | June 12, 1883 |
| 922,970 | Staal | May 25, 1909 |
| 2,820,655 | Hileman | Jan. 21, 1958 |